United States Patent [19]

Sas

[11] 4,305,619
[45] Dec. 15, 1981

[54] DUMP BED SAFETY PROP

[76] Inventor: Wilbert Sas, 3221 Marion Rd., Southeast, Rochester, Minn. 55901

[21] Appl. No.: 96,222

[22] Filed: Nov. 20, 1979

[51] Int. Cl.³ .............................................. B60P 1/04
[52] U.S. Cl. .................................. 298/17 B; 292/338
[58] Field of Search .................... 298/17 B; 217/60 R, 217/60 B, 60 C; 292/338

[56] References Cited

U.S. PATENT DOCUMENTS

| 1,523,525 | 1/1925 | Hatashita | 298/17 B |
| 2,537,799 | 1/1951 | Stevenson | 217/60 R |
| 3,272,558 | 9/1966 | Rathman et al. | 298/17 B |
| 3,813,124 | 5/1974 | Roland | 298/17 B |

FOREIGN PATENT DOCUMENTS

| 1255512 | 11/1967 | Fed. Rep. of Germany | 298/17 B |
| 1480147 | 9/1969 | Fed. Rep. of Germany | 298/17 B |
| 491500 | 4/1976 | U.S.S.R. | 298/17 B |

Primary Examiner—Leslie J. Paperner
Attorney, Agent, or Firm—Harvey B. Jacobson

[57] ABSTRACT

A prop assembly including an elongated prop leg is provided having one end pivotally mounted to an associated vehicle dump bed for swinging movement between a first generally horizontal retracted position when the dump bed is in its lowered position and a second depending operative position with one end of the leg inclined downwardly when the load bed is in a raised inclined dumping position. Structure is provided for limiting swinging movement of the leg toward its lowered operative position with the leg angularly displaced relative to the bed less than that angular displacement from the retracted position of the leg which would allow the leg to depend vertically downwardly from the bed. The lower end of the leg is positioned, when the bed is lowered from the raised limit position thereof to an intermediate position between the raised and lowered limit positions and the leg is in its lowered operative limit position, for automatic engagement with a leg locating and seat structure provided on the frame of the associated vehicle to establish a partially raised position of the load bed in which the latter is propped through utilization of the prop leg.

8 Claims, 5 Drawing Figures

U.S. Patent  Dec. 15, 1981  4,305,619
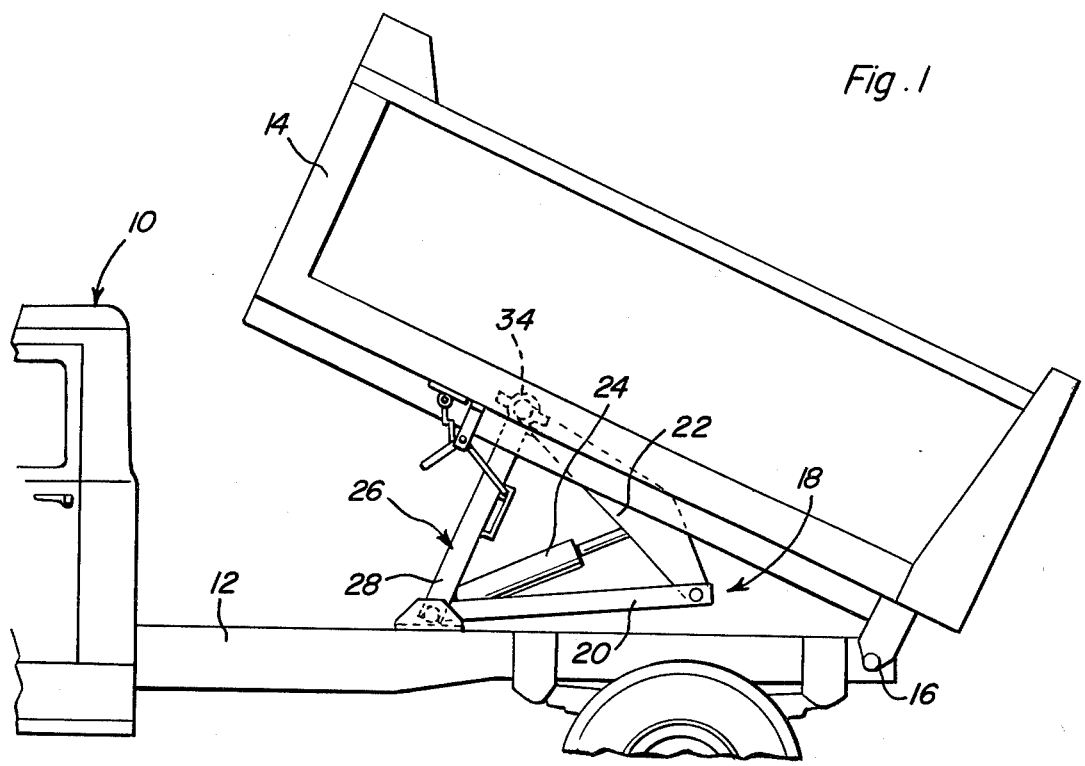
Fig. 1
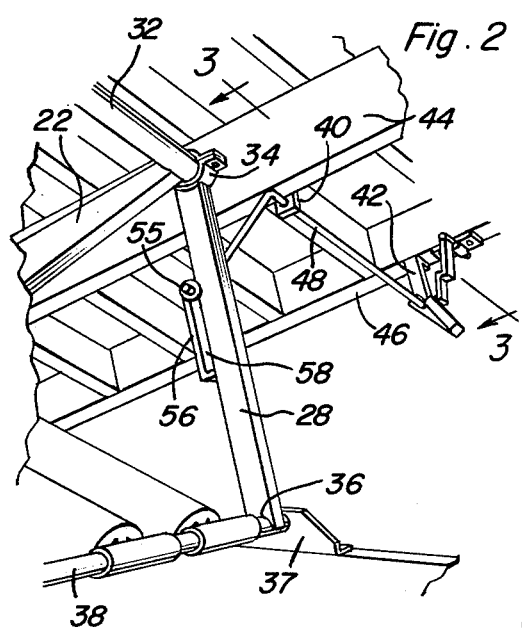
Fig. 2
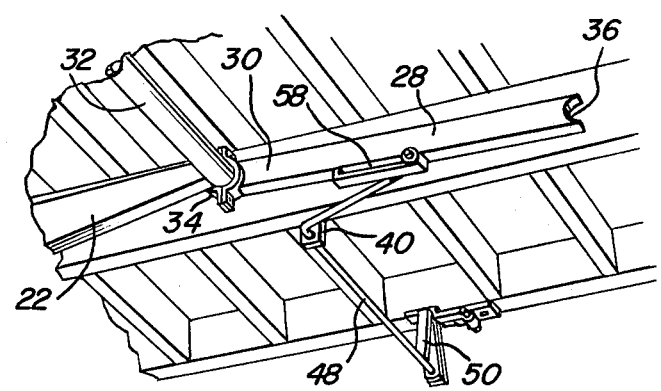
Fig. 4
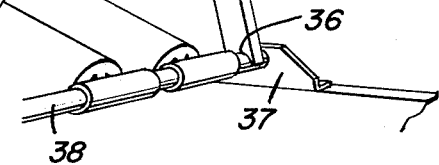
Fig. 3
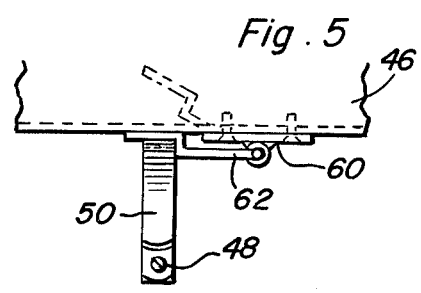
Fig. 5
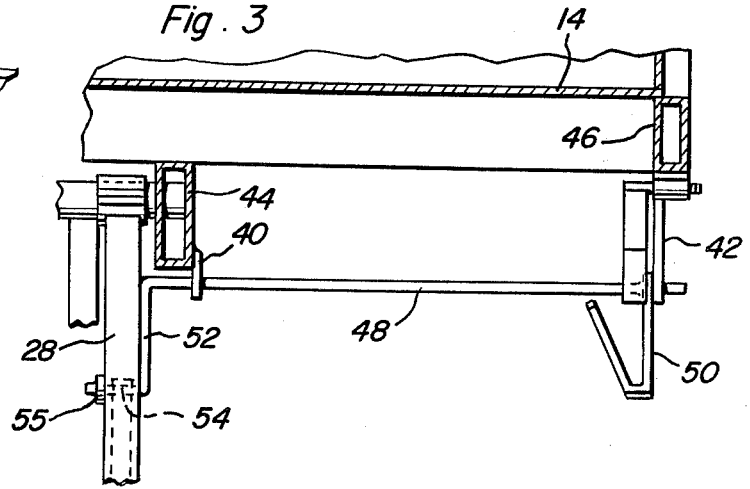

DUMP BED SAFETY PROP

BACKGROUND OF THE INVENTION

Various forms of load bed propping mechanisms have been heretofore designed for the purpose of propping the load bed of a dump truck or the like in a partially raised position. Examples of various forms of props and other structures including some of the general structural and operational features of the instant invention are disclosed in U.S. Pat. Nos. 296,938, 1,523,525, 2,407,012 and 3,813,124. However, these previously known forms of props are not operative in a fully automatic manner or independent of danger to the operator thereof to prop the associated load bed in a predetermined partially raised condition.

Therefore, a need exists for a load bed prop which may be actuated after raising the associated load bed fully and thereafter relied upon to automatically prop the load bed in a partially raised position as the load bed is lowered from its fully raised position.

BRIEF DESCRIPTION OF THE INVENTION

The safety prop of the instant invention is constructed in a manner whereby it may be readily installed on substantially all forms of vehicles equipped with dumping load beds. Further, the prop is constructed in a manner whereby the prop, during installation on a given vehicle, is automatically adjusted for proper automatic operation in conjunction with that vehicle.

The main object of this invention is to provide a safety prop for a dump load bed and which may be utilized to prop a load bed in a partially raised position.

Another object of this invention is to provide a safety prop constructed in a manner whereby the prop may be actuated upon movement of the associated load bed to its fully raised position and then automatically brought into operation as the load bed is lowered to the desired partially raised condition.

Another very important object of this invention is to provide a load bed prop which may be readily mounted on substantially all vehicles equipped with dumping load beds.

A still further object of this invention is to provide a load bed prop in accordance with the preceding objects and including a readily operable latch therefor.

Another object of this invention is to provide a load bed prop which may be utilized in conjunction with hydraulically actuated dumping mechanisms as well as cable dumping mechanisms.

A final object of this invention to be specifically enumerated herein is to provide a dump bed safety prop in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary side elevational view of a conventional form of dump truck with the load bed thereof in a partially raised position and propped in that position through utilization of the safety prop of the instant invention;

FIG. 2 is a fragmentary perspective view of the assemblage illustrated in FIG. 1 and as seen from the underside of the dump truck load bed;

FIG. 3 is an enlarged fragmentary transverse vertical sectional view taken substantially upon the plane indicated by section line 3—3 of FIG. 2;

FIG. 4 is a fragmentary underside perspective view of the dump bed illustrating the safety prop in a retracted position; and FIG. 5 is a fragmentary side elevational view illustrating the safety prop latched in the raised retracted position.

DETAILED DESCRIPTION OF THE INVENTION

Referring now more specifically to the drawings, the numeral 10 generally designates the conventional form of dump truck including a main frame 12 and a load bed 14 pivotally supported from the frame 12 as at 16 for swinging between a lowered horizontal load carrying load limit position and a raised inclined dumping limit position, the load bed 14 being illustrated in FIG. 1 in a partially raised position intermediate the lowered and raised limit positions.

A lift mechanism referred to in general by the reference numeral 18 is operatively connected between the frame 12 and the dump bed 14. The lift mechanism 18 includes pivotally interconnected arm assemblies 20 and 22 pivotally connected to the frame 12 and dump bed 14, respectively, and a hydraulic cylinder 24 operatively connected between the arm assemblies 20 and 22 for effecting relative angular displacement thereof, the lifting mechanism 18 being substantially conventional in design.

The prop assembly of the instant invention is referred to in general by the reference numeral 26 and includes an elongated prop leg 28 having one end 30 thereof pivotally attached to the cross shaft portion 32 of the arm assembly 22 by which the latter is pivotally attached to the dump bed 14. The prop leg end 30 is pivotally anchored to the cross shaft portion 32 as at 34 and the opposite free end of the prop leg 28 includes an endwise outwardly opening notch 36 formed therein.

The arm assembly 22 of the lift mechanism 18 is pivotally attached to the frame 12 through the utilization of an anchoring structure 37 of the lift mechanism 18 secured to the frame 12 and including a shaft portion 38 extending between the opposite sides of the frame 12. The notch 36 in the free end of the prop leg 26 is seatingly engageable with one end of the shaft portion 38 in order to prop the dump bed 14 in a dumping position thereof intermediate the fully raised position of the dump bed and the lowered horizontal load carrying position of the dump bed.

A pair of depending mounting brackets 40 and 42 are supported from longitudinal members 44 and 46 of the dump bed 14 and rotatably journal the opposite ends of a control shaft 48 for the prop leg 28. The outer end of the control shaft 48 journaled from the mounting bracket 42 includes an operating lever 50 supported therefrom and the inner end of the control shaft 48 journed from the mounting bracket 40 includes a lever arm 52 supported therefrom which passes closely along the outer side of the prop leg 28. Also, the free end of the lever arm 52 terminates in a right angulated inwardly directed terminal end 54 having a guide and abutment washer 55 mounted on its free inner end.

The prop leg 28 includes a U-shaped strap member 56 secured thereto by welding and the strap member 56 defines a slot 58 extending along the corresponding side of the prop leg 28 through which the terminal end 54 extends and in which the terminal end 54 is slidingly and guidingly received, the washer 55 preventing axial withdrawal of the terminal end 54 from the slot 58.

It also will be seen from FIG. 5 of the drawings, that a mounting bracket 60 is supported from the frame member 46 and that a gravity-type latch lever 62 is pivotally supported from the mounting bracket 60. When the lever arm 50 is in an upwardly directed position such as that illustrated in FIG. 4 of the drawings, the latch lever 62 may be engaged with the upper end of the lever 50 in order to lock the lever 50 in the raised position. When the lever 50 is in the raised position, the prop leg 28 is in its raised retracted position illustrated in FIG. 4 of the drawings.

It will be noted that when the prop leg 28 is swung downwardly toward the operative position thereof illustrated in FIG. 1, the terminal end portion 54 seats in the upper end of the slot 58 and thereby limits downward swinging of the free end of the prop leg 28 having the notch 36 disposed therein. Further, the prop leg 28 is inclined forwardly and downwardly and is thereby retained in its lowered limit position by gravity. Further, the limit position of downward swinging movement of the prop leg 28 is predetermined in a manner such that when the dump bed 14 is lowered from the fully raised limit position above the position thereof illustrated in FIG. 1 down to the partially raised position illustrated in FIG. 1 the notch 36 in the lower end of the prop leg 28 will automatically be positioned correctly for engagement with the adjacent end of the shaft portion 38. Thus, once the dump bed 14 has been fully raised and the prop leg 28 has been lowered to its lower limit position, the prop leg 28 will automatically be positioned for operative engagement with the adjacent end of the shaft portion 38 when the dump bed 14 is lowered from the fully raised position to the partially raised position illustrated in FIG. 1. Of course, the strap member 56 is welded in the correct position thereof to establish the precise lowered limit position of the prop leg 28 illustrated in FIGS. 1 and 2 when the prop assembly is initially installed. In this manner, proper positioning of the prop leg 28 when the dump bed 14 is in partially raised position illustrated in FIG. 1 in order for the notch 36 in the lower end of the prop leg 28 to engage the shaft portion 38 is assured.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination, a vehicle including a main frame and a dump bed pivotally supported from said frame for angular displacement relative to said frame about a first horizontal axis between a lowered horizontal load carrying limit position and a raised inclined dumping limit position, a lift mechanism operatively connected between said frame and bed for controllably angularly displacing said bed relative to said frame, and a prop assembly for propping said dump bed relative to said frame in a partially raised position intermediate said limit positions, said prop assembly including an elongated prop leg, means pivotally attaching one end of said prop leg to said bed for angular displacement about a second axis transverse to said leg and generally paralleling said first axis, said frame including prop leg locating and seat structure, said prop leg being swingable relative to said bed between a first generally horizontal retracted position when said bed is in the lowered limit position and a second depending operative position with the other end of said leg inclined downwardly when said load bed is in said raised inclined dumping limit position, said prop assembly further including operating means shiftably supported from said bed for shifting between first and second positions and operatively connected to said prop for swinging the latter to the first and second positions thereof responsive to shifting of said operating means to its first and second positions, respectively, said prop leg and operating means including coacting limit means establishing a limit of swinging movement of said prop leg toward said operative position with said leg angularly displaced relative to said bed less than that angular displacement from said retracted position which would allow said leg to depend vertically downwardly from said bed, the lower end of said leg, when said leg is in said operative limit position and said bed is lowered from said raised limit position toward said lowered limit position, being positioned for automatic engagement with said leg locating and seat structure to establish said partially raised position.

2. The combination of claim 1 including latch structure shiftably supported from said load bed operative to releasably retain said operating means in the first position thereof.

3. The combination of claim 1 wherein said lift mechanism includes a horizontal transverse shaft supported from said frame, one end of said shaft comprising said prop leg locating and seat structure, the free end of said prop leg having an endwise outwardly opening notch formed therein in which said one end of said shaft is seatingly engageable.

4. In combination, a vehicle including a main frame and a dump bed pivotally supported from said frame for angular displacement relative to said frame about a first horizontal axis between a lowered horizontal load carrying limit position and a raised inclined dumping limit position, a lift mechanism operatively connected between said frame and bed for controllably angularly displacing said bed relative to said frame, and a prop assembly for propping said dump bed relative to said frame in a partially raised position intermediate said limit positions, said prop assembly including an elongated prop leg, means pivotally attaching one end of said prop leg to said bed for angular displacement about a second axis transverse to said leg and generally paralleling said first axis, said frame including prop leg locating and seat structure, said prop leg being swingable relative to said bed between a first generally horizontal retracted position when said bed is in the lowered limit position a depending operative position with the other end of said leg inclined downwardly when said load bed is in said raised inclined dumping limit position, said prop assembly including limit means operatively connected between said bed and prop leg establishing a limit of swinging movement of said prop leg toward said operative position with said leg angularly displaced relative to said bed less than that angular displacement from said retracted position which would allow said leg to depend vertically downwardly from said bed, the lower end of said leg, when said leg is in said operative limit position and said bed is lowered from said raised limit position toward said lowered limit position, being positioned for automatic engagement with said leg locating and seat structure to establish said partially raised position, said limit means including guide structure guidingly engaged with said leg intermediate its opposite ends also functional to guide said leg against lateral deflection of the free end thereof in opposite directions paralleling said axes.

5. The combination of claim 4 wherein said limit means includes a U-shaped strap member opening toward and secured to one side of said prop leg intermediate its opposite ends, a crank arm pivotally supported from said load bed for angular displacement about an axis generally paralleling said second axis, the free end of said crank arm including a generally right angulated terminal end slidingly received between said one side of said prop leg and said strap member.

6. The combination of claim 5 wherein said crank arm is carried by one end of an operating shaft oscillatably journaled from said load bed, the other end of said shaft including a second lever arm supported therefrom comprising a handle for imparting rotary torque to said operating shaft.

7. The combination of claim 6 including latch means for releasably securing said prop leg in said retracted position.

8. The combination of claim 7 wherein said latch means includes a latch member shiftably supported from said load bed and releasably engageable with said second lever arm when said prop leg is in said retracted position.

* * * * *